(12) United States Patent
Kugler et al.

(10) Patent No.: US 11,560,914 B2
(45) Date of Patent: Jan. 24, 2023

(54) SYSTEM FOR FASTENING COOLING ELEMENTS

(71) Applicants: AUDI AG, Ingolstadt (DE); G.H. INDUCTION DEUTSCHLAND INDUKTIONS-ERWÄRMUNGS-ANLAGEN GMBH, Hirschhorn (DE)

(72) Inventors: Andreas Kugler, Rennertshofen (DE); Jürgen Frühtrunk, Baar-Ebenhausen (DE); Andreas Balss, Rimbach (DE); Frank Schölch, Hirschhorn (DE)

(73) Assignee: G.H. Induction Deutschland Induktions-ErwäRmungs-Anlagen GmbH, Hirschhorn (DE)

( * ) Notice: Subject to any disclaimer, the term of this patent is extended or adjusted under 35 U.S.C. 154(b) by 158 days.

(21) Appl. No.: 16/641,570

(22) PCT Filed: Jul. 25, 2018

(86) PCT No.: PCT/EP2018/070107
§ 371 (c)(1),
(2) Date: Feb. 24, 2020

(87) PCT Pub. No.: WO2019/038005
PCT Pub. Date: Feb. 28, 2019

(65) Prior Publication Data
US 2020/0266502 A1 Aug. 20, 2020

(30) Foreign Application Priority Data
Aug. 25, 2017 (DE) .......................... 102017214881.0

(51) Int. Cl.
*F16B 11/00* (2006.01)
*H01M 10/613* (2014.01)
(Continued)

(52) U.S. Cl.
CPC .......... *F16B 11/006* (2013.01); *H01M 10/04* (2013.01); *H01M 10/613* (2015.04); *H01M 10/625* (2015.04); *H01M 10/655* (2015.04)

(58) Field of Classification Search
CPC ............... F16B 11/006; H01M 10/613; H01M 10/04; H01M 10/625; H01M 10/655
See application file for complete search history.

(56) References Cited

U.S. PATENT DOCUMENTS

| 2010/0074715 A1 | 3/2010 | Oka et al. | |
| 2010/0248029 A1* | 9/2010 | Butt | H01M 10/6555 |
| | | | 429/211 |
| 2015/0214531 A1* | 7/2015 | Sun | H01M 50/502 |
| | | | 429/120 |

FOREIGN PATENT DOCUMENTS

| EP | 1159363 B1 | 4/2003 |
| JP | 2015185535 A | 10/2015 |

OTHER PUBLICATIONS

Chinese Search Report dated Feb. 21, 2022 with respect to counterpart Chinese patent application 2018800548690.
(Continued)

*Primary Examiner* — Eret C McNichols
(74) *Attorney, Agent, or Firm* — Henry M. Feiereisen LLC

(57) ABSTRACT

A system for fastening cooling elements to a component includes a base device with rows of heating elements to support a bottom side of the component, and a gripping device arranged on the base device and including a corresponding number of rows with rail elements configured to temporarily hold the cooling elements on the gripping device and arranged such that an nth row of heating elements is congruent with an nth row of rail elements. An adhesive joint is applied onto a component topside in strips congruent with the rows of heating elements. The gripping device
(Continued)

arranges the cooling elements on the strips of the adhesive joint and presses them against the topside of the component, wherein the heating elements heat the adhesive joint between the cooling elements and the component topside to a temperature which is at least as high as a curing temperature of the adhesive joint.

10 Claims, 6 Drawing Sheets

(51) Int. Cl.
*H01M 10/04* (2006.01)
*H01M 10/625* (2014.01)
*H01M 10/655* (2014.01)

(56) References Cited

OTHER PUBLICATIONS

English translation of Chinese Search Report dated Feb. 21, 2022 with respect to counterpart Chinese patent application 2018800548690.

\* cited by examiner

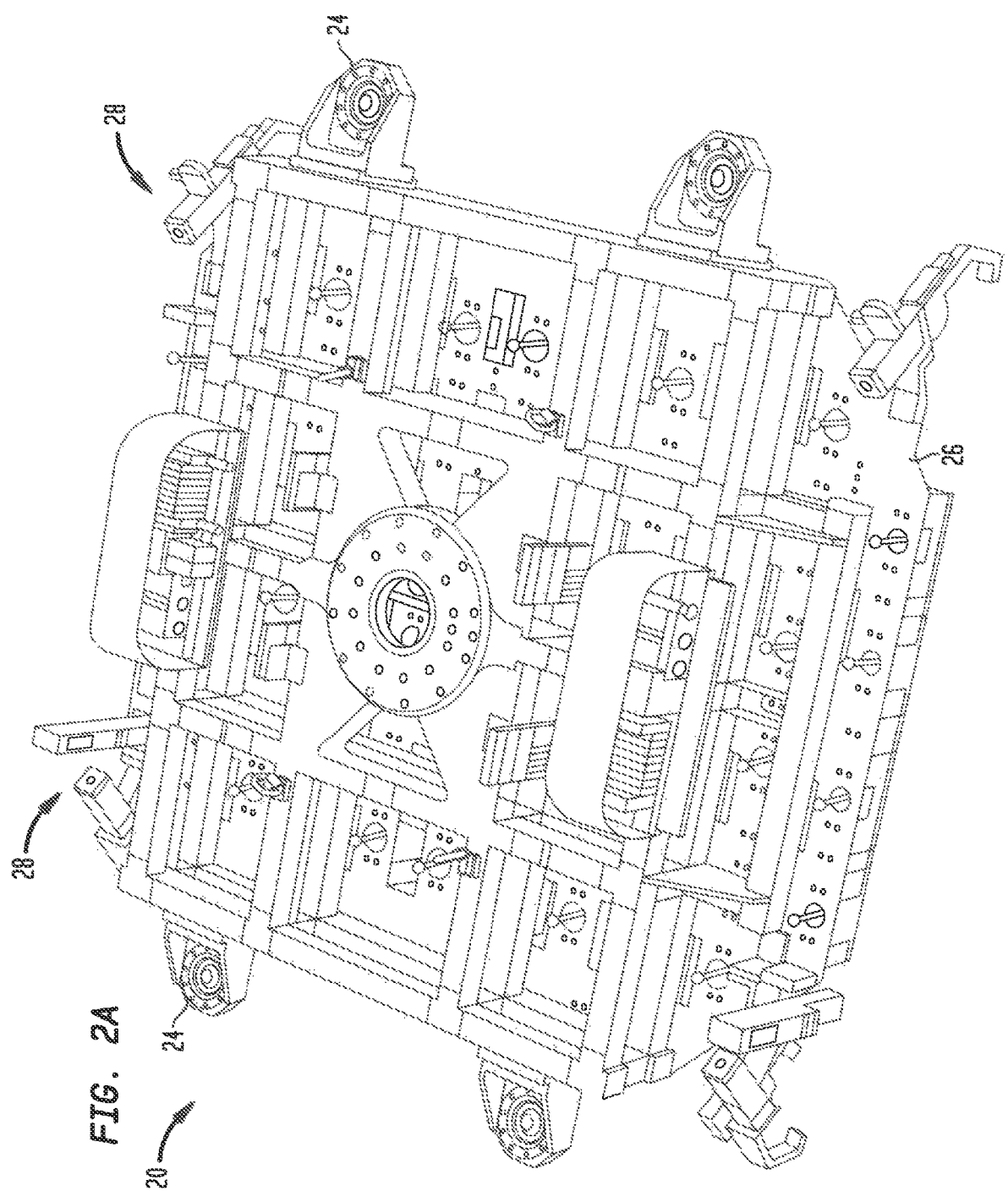

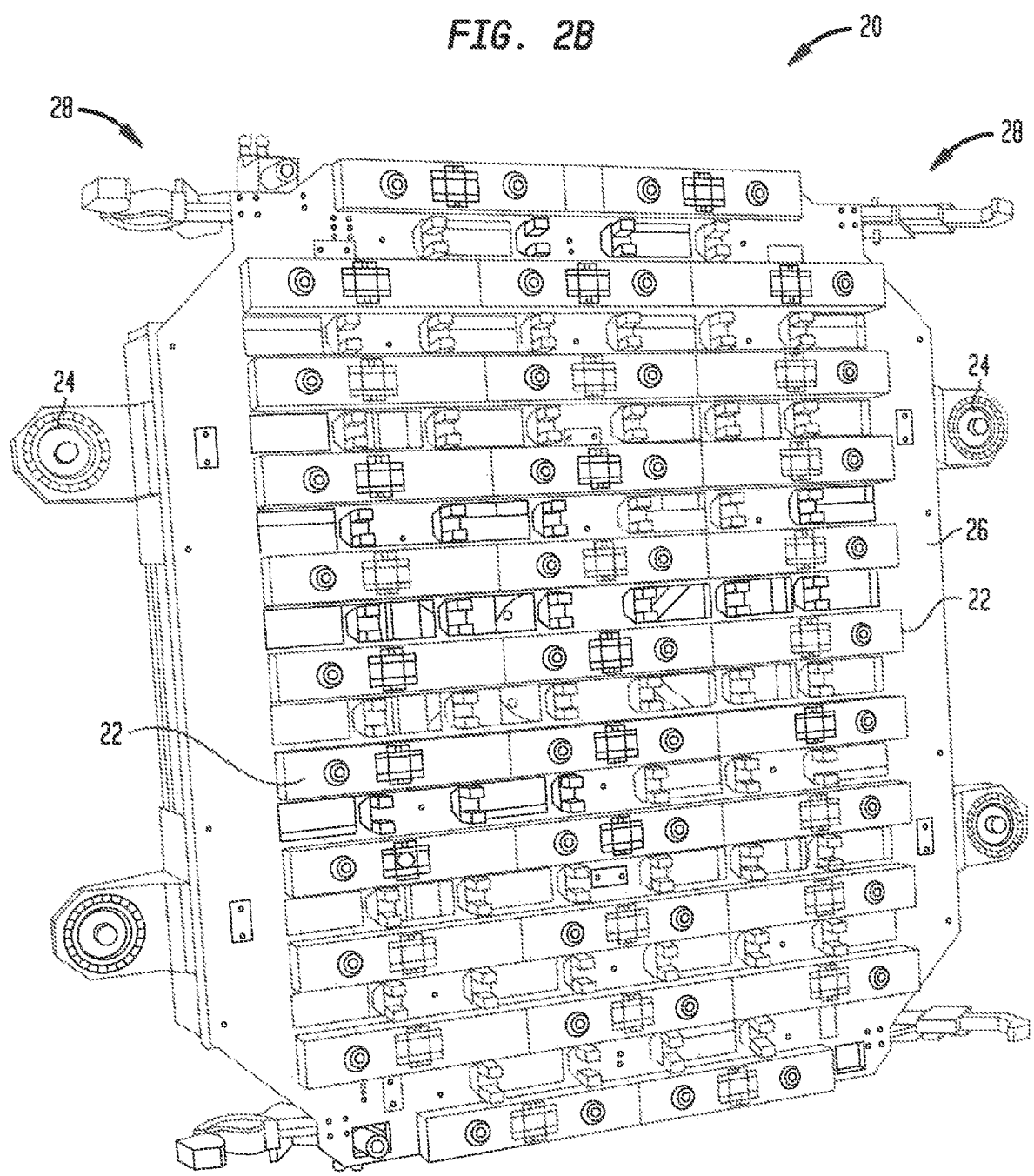

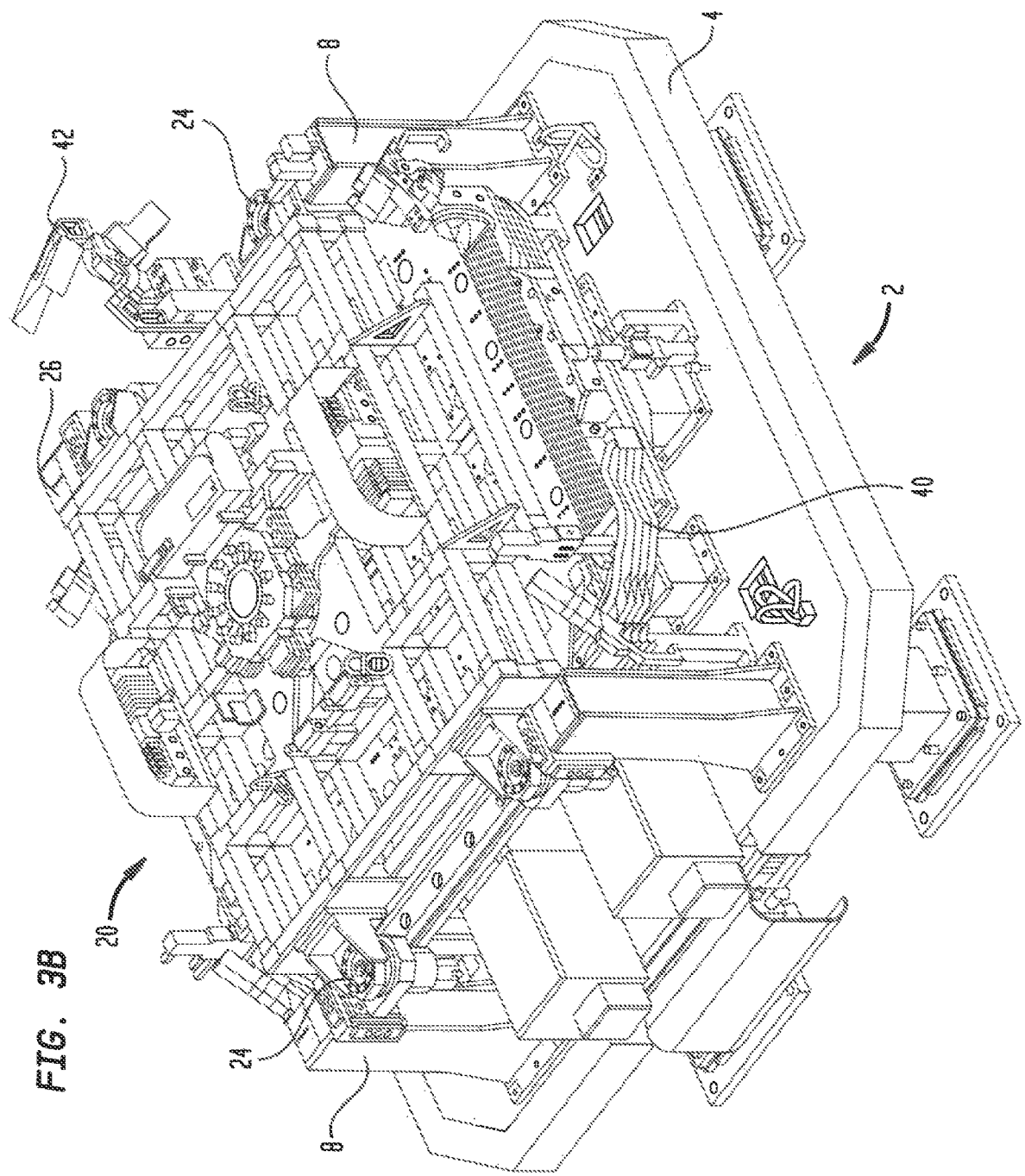

SYSTEM FOR FASTENING COOLING ELEMENTS

CROSS-REFERENCES TO RELATED APPLICATIONS

This application is the U.S. National Stage of International Application No. PCT/EP2018/070107 filed Jul. 25, 2018, which designated the United States and has been published as International Publication No. WO 2019/038005 A1 and which claims the priority of German Patent Application, Serial No. 10 2017 214 881.0, filed Aug. 25, 2017, pursuant to 35 U.S.C. 119(a) (d).

BACKGROUND OF THE INVENTION

The invention relates to a system for fastening cooling elements to a component and to a method for fastening cooling elements to a component.

A vehicle can have a battery which stores electrical energy for driving the vehicle. It is hereby necessary to cool the battery with an appropriate cooling system which, however, needs to be fastened to the battery.

Document DE 10 2014 004 742 A1 discloses a battery system with a thermally conductive battery casing and a heat dissipation system. The heat dissipation system is hereby adhesively bonded to the battery casing.

Document DE 10 2014 204 263 A1 discloses a battery cooling system which includes a cooling plate comprised of several plastic parts that are adhesively bonded together.

A device for cooling a battery is described in document DE 20 2012 101 076 U1 and includes a cooling plate with which heat transfer means are adhesively bonded.

Against this background, it was an object to provide a casing of a battery with cooling elements.

SUMMARY OF THE INVENTION

This object is attained with a system and a method with the features of the independent claims. Embodiments of the system and the method are set forth in the dependent patent claims and the description.

The system according to the invention is configured for fastening cooling elements to a component which has a bottom side and a topside and which has a base device, a gripping device and, in one configuration, at least one application device for an adhesive joint. The base device has a number of rows with heating elements, with the heating elements of each row being arranged side-by-side. The gripping device has a corresponding number of rows with rail elements, with the rail elements of each row being arranged side-by-side. An nth row with heating elements is hereby in congruence with an nth row with rail elements, when the gripping device is arranged on the base device. To fasten the cooling elements, the bottom side of the component is to be arranged on the heating elements. The at least one application device is configured for this purpose to apply strips of the adhesive joint upon a base-device-distal topside of the component, i.e. in strips and/or rows which are in congruence to the rows along which the heating elements are arranged. Moreover, the cooling elements should be arranged along the rows of rail elements of the gripping device. For this purpose, the rail elements are configured to temporarily hold the cooling elements onto the gripping device. For this purpose, the gripping device is configured to arrange the cooling elements on and/or along the strips of the adhesive joint and to press them against the topside of the component or to press them depending upon the definition. For this purpose, the heating elements are configured to warm up or heat the adhesive joint between the cooling elements and the topside of the component along the rows to a temperature which is at least as high as a curing temperature of the adhesive joint.

Provision is made for the heating elements to have induction coils for warming up or, depending upon the definition, for heating the adhesive joint along the rows.

Each rail element has at least one holding element and at least one pressure element, with the at least one holding element, e.g. a hydraulic suction element, being configured for this purpose to temporarily hold at least one cooling element upon the rail element. Each rail element includes an elastically deformable body, e.g. made of rubber. The at least one pressure element is configured for this purpose to press the rail element with at least one cooling element temporarily arranged thereon against the topside of the component and to homogeneously disperse the adhesive joint between the at least one cooling element and the topside. In the event the cooling elements should be magnetic, it is possible that the holding elements have magnets, e.g. electromagnets, with magnetic fields which can be switched on and off and which are activated at least for so long as the cooling elements are placed and/or arranged on the adhesive joint, which has been applied as strips, along these strips. The magnetic fields can be deactivated as soon as the induction coils are switched on. Conversely, non-magnetic cooling elements are held by suction elements.

The base device and the gripping device each have positioning modules that are connectable to each other. The interconnected positioning modules are hereby configured to position the base device and the gripping device in relation to each other and to arrange hereby the nth row of heating elements in congruence with the nth row of rail elements.

The system has at least one clamping module, which when fastened on the base device and/or the gripping device are fastened, can be fastened and/or should be fastened and be configured for this purpose to brace the base device and the gripping device with one another and thus to connect them. The at least one clamping module is arranged on the base device and/or the gripping device. The base device and the gripping device are connectable to one another via a plurality of clamping modules. For this purpose, the clamping modules are configured to press the base device and the gripping device against one another. It is hereby possible to enable adjustment of a definable distance for the adhesive joint between the topside of the component and outer sides of the cooling elements.

According to a configuration, the base device has support elements which are arranged on the heating elements and/or cover the heating elements. The component can be arranged on the support elements. Each heating element is indirectly to be connected with the component by a support element arranged on the heating element and forming a wall of the heating element, with a direct contact of the heating element to the component being avoided by the support element located there between.

Depending on the configuration of the system, it is possible to arrange the component directly on the heating elements. In the event, the system has the support elements, the component is to be arranged directly upon the support elements and thus indirectly or not directly on the heating elements.

The method according to the invention is provided for fastening cooling elements to a component which has a bottom side and a topside. The method is carried out with an embodiment of the system according to the invention, which includes a base device, a gripping device and, in one configuration, at least one application device for an adhesive joint. The base device has a number of rows with heating elements, with the heating elements being arranged along a respective row. The gripping device has a corresponding number of rows with rail elements, with the rail elements being arranged along a respective row. An nth row with heating elements is hereby in congruence with an nth row of rail elements, when the gripping device is arranged on the base device. Within the scope of the method, the bottom side of the component is arranged on the heating elements, with the adhesive joint being applied or to be applied with the at least one application device upon the base-device-distal topside of the component in strips and/or as strips in congruence with the rows along which the heating elements are arranged. Thus, strips of the adhesive are applied to the component in congruence with the rows of heating elements. The cooling elements are arranged along the rows of rail elements, with the cooling elements with the rail elements being temporarily held on the gripping device. Moreover, the cooling elements are arranged with the gripping device along the strips of the adhesive joint and pressed against the topside of the component. The adhesive joint between the cooling elements and the topside of the component is warmed up with the heating elements to a temperature or heated depending upon the definition to a temperature which is at least as high as a curing temperature of the adhesive joint.

As soon as the adhesive joint along the strips between the rows of cooling elements and the topside of the component has been heated to the temperature, which is at least as high as the curing temperature, for at least a period of time provided for this purpose, the heating elements are switched off. It is now possible to lift the gripping device. The cooling elements are now fastened to the component. It is conceivable to provide the base device with a cooling system for cooling the component with the cooling elements as soon as the adhesive joint has cured.

An adhesive joint is normally used which has two adhesive components that are mixed with one another and cure together when being heated at least to the curing temperature.

According to one configuration, cooling elements, e.g. cooling fins or cooling ribs, are fastened to a component that is intended to be provided or is provided as part of a casing of a battery.

The cooling elements and the topside of the component with the strips of adhesive joint located there between are pressed against each other between the rail elements and the heating elements, with a minimum distance for the adhesive joint being adjusted and/or maintained between the cooling elements and the component.

The introduced system is configured to reliably apply a thermally conductive adhesive or the adhesive joint, which has the two adhesive components, in strips as provided for this purpose and/or as strips provided for this purpose, and then to join the cooling elements to the topside of the component. The adhesive joint is hereby pressed from inside to outside with an application device, embodied e.g. as adhesive bead, with respect to a center line of an intended strip from the adhesive joint. If the adhesive joint has two adhesive components, it is possible to mix these two adhesive components with the at least one application device and to apply them together to the topside of the component.

Regardless of possible embodiments, provision is made for the adhesive joint to be applied to the topside of the component without any air pockets. Moreover, a uniform adhesive gap is established for the adhesive joint between the topside of the component and the outer sides of the cooling elements over the definable distance. Subsequently, the adhesive joint is warmed up or heated by the heating elements, which are integrated in the base device, thereby triggering a curing process for the adhesive joint. A strip of the adhesive joint or the adhesive joint cures hereby in its position within the adhesive gap along a respectively provided strip which is in congruence with both a respective row of heating elements and a respective row of rail elements. In general, cooling elements are to be adhesively bonded on a casing of a battery by the system when executing one embodiment of the method.

The system enables the coding elements to be joined to the component, e.g. the casing, while at the same time compressing the adhesive joint or the adhesive and simultaneously and/or subsequently heating the adhesive joint between the cooling elements and the topside of the component in order to cure the adhesive joint, which is normally made of two adhesive components, without pores and with a uniform adhesive gap of a height of approx. 0.5 mm, e.g. 0.5 mm-0.3 mm or 0.5 mm+0.5 mm. The provided adhesive gap and its height are adjusted, i. a. by adjusting the distance between the heating elements and the clamping modules.

In the introduced system, the base device forms a bottom part on which the component is to be arranged, with the heating elements receiving the component. Moreover, the base device forms a buttress for compressing the adhesive joint. The heating elements of the base device are embodied, e.g. as induction coils, and include tetragonal, e.g. rectangular, square and/or shaped as quadrilateral copper lines or copper tubes, which are also configured to cool the heating elements as soon as the adhesive joint has cured. The cooling elements are received by the gripping device, which is also configured and/or referred to as the top part of the system, with suction members or suction elements of the rail elements. The clamping modules or clamping units as well as the positioning modules, which are each arranged on the sides of the base device and the gripping device, enable exact positioning of the base device and the gripping device above one another, with the result that an nth row of rail elements and an nth row of heating elements can be arranged with respect to one another and/or relative to one another in congruence.

According to one configuration, provision is made for surfaces of the heating elements to form flat supports and/or to have the support elements which enable a subsequent dimensional adjustment in height or width of the adhesive gap for the adhesive joint.

With the system and the method, it becomes possible, for example, to arrange cooling elements on a casing of a battery for a vehicle, with the battery being suitable to store electrical energy for driving the vehicle, wherein the battery can be charged with electric energy and also be discharged again. An external cooling system can be provided for the battery via the cooling elements on the casing of the battery so as to protect the battery against overheating and thus against destruction.

Provision is made, for example, for the rail elements to have elastic, generally hard-elastic pressure elements for pressing the cooling elements in a direction of the topside of the component while maintaining the adhesive gap provided for the adhesive joint.

It is possible within the scope of the method to adjust an actual value of the pressure onto the adhesive joint along the strip within the adhesive gap to a respectively provided target value, and to hereby i. a. buildup the pressure. It is also provided to heat the adhesive joint within the adhesive gap by the heating elements, normally inductively, wherein it is also possible to adjust a correspondingly current actual value of the temperature to a target value provided for this purpose, with the target value generally being at least as great as the curing temperature of the adhesive joint. However, it is also possible for a target value of the pressure and a target value of the temperature to be correlated and/or coordinated with one another. This makes it possible, for example, to cure the adhesive joint in an intended manufacturing period and thus a corresponding period of time. The adhesive gap has a height or width of a fraction of a millimeter up to about a millimeter.

Furthermore, it is possible to arrange on each heating element a thermally conductive and mechanically stable, e.g. hard-elastic deformable, wall or a corresponding panel, as support element on which the bottom side of the component is to be arranged. If a respective heating element is embodied as induction coil and/or has such an induction coil, it becomes possible to distance the bottom side of the component from a respective induction coil with the support element. A respective induction coil, which is arranged along a respective row of heating elements, generates inductive eddy currents to heat metallic modules, e.g. the component and/or the cooling elements, so that in turn the adhesive joint between the cooling elements and the component is heated.

According to a possible embodiment of the method, the adhesive joint is indirectly heated by the heating elements at least via the component and/or the cooling elements, with a temperature being heated within a predetermined definable period of time to a target value which, for example, is at least as great as the curing temperature. Furthermore, this temperature is maintained during a second period of time at the provided target value. The target value corresponds hereby for the temperature to, for example, 80° C. The first period of time or a heat-up phase, during which the temperature of the adhesive joint is heated to the target value, lasts, e.g. 40 seconds. The second period of time or holding phase, during which the temperature is maintained at the target value, lasts, e.g. 200 seconds.

After switching off the induction coils of the heating elements, the component and the cooling elements cool down comparatively quickly. However, it is also possible that a cooling system for influencing the temperature of the adhesive joint is arranged in the base device during the process. This cooling system includes a recooler which uses e.g. water as coolant. Moreover, provision is made for a thermostatic pipe water regulation, a storage tank, an internal pressure pump for the coolant, and sensors for monitoring a temperature feel, a flow rate, and a need for water as coolant. Moreover, it is possible to set a pressure of the coolant to at least 3 bar, maximal 10 bar. A temperature of the coolant is 10 to 30° C. for example.

When implementing the method, the adhesive joint is first applied or added in form of strips in congruence with the rows of heating elements in a defined period of time upon the topside of the component. Thereafter, also within a definable period of time, the cooling elements are arranged over the rail elements of the gripping device, likewise along the provided rows that are in congruence with the strips of the applied adhesive joint. During the process, only the adhesive joint along a respectively provided strip, which is congruent with to a respective row of heating elements, is deliberately heated.

Surfaces of the clamping modules are made, for example, of hard rubber, polyvinyl chloride (PVC) or foam. The rail elements are comparatively hard, but still slightly resilient.

Furthermore, provision is made for outer sides of the cooling elements to be adhesively bonded to the topside of the component via the adhesive joint flatly as strips or along the strips as intended for this purpose.

According to one configuration, the adhesive joint is applied along a respectively provided strip with an application device embodied as adhesive bead upon the topside of the component.

According to a possible configuration, the heating elements are arranged in support elements and/or underneath support elements, on which the component is arranged. The support elements are hereby arranged along rows in accordance with the heating elements integrated therein, with the support elements and the heating elements of an nth row being in congruence with an nth row of the rail elements, when the gripping device will be or is arranged on the base device. Correspondingly, the adhesive joint is to be applied along an nth strip which is congruent with the nth row of heating elements and possibly support elements.

Further advantages and configurations of the invention become apparent from the description and the accompanying drawing.

It is to be understood that the afore-mentioned features and the features yet to be explained hereinafter can be used not only in the respectively specified combinations, but also in other combinations or taken alone, without departing from the scope of the present invention.

BRIEF DESCRIPTION OF THE DRAWING

An embodiment of the invention is illustrated schematically in the drawings and is described schematically and in detail with reference to the drawings.

FIGS. 2a and 2b show schematic illustrations of an example of a gripping device as component of the embodiment of the system according to the invention from different perspectives;

FIGS. 3a and 3b show by way of schematic perspective illustrations two steps of an embodiment of the method according to the invention, which can be executed by the afore-introduced components of the system according to the invention.

DETAILED DESCRIPTION OF PREFERRED EMBODIMENTS

Figure 1A:
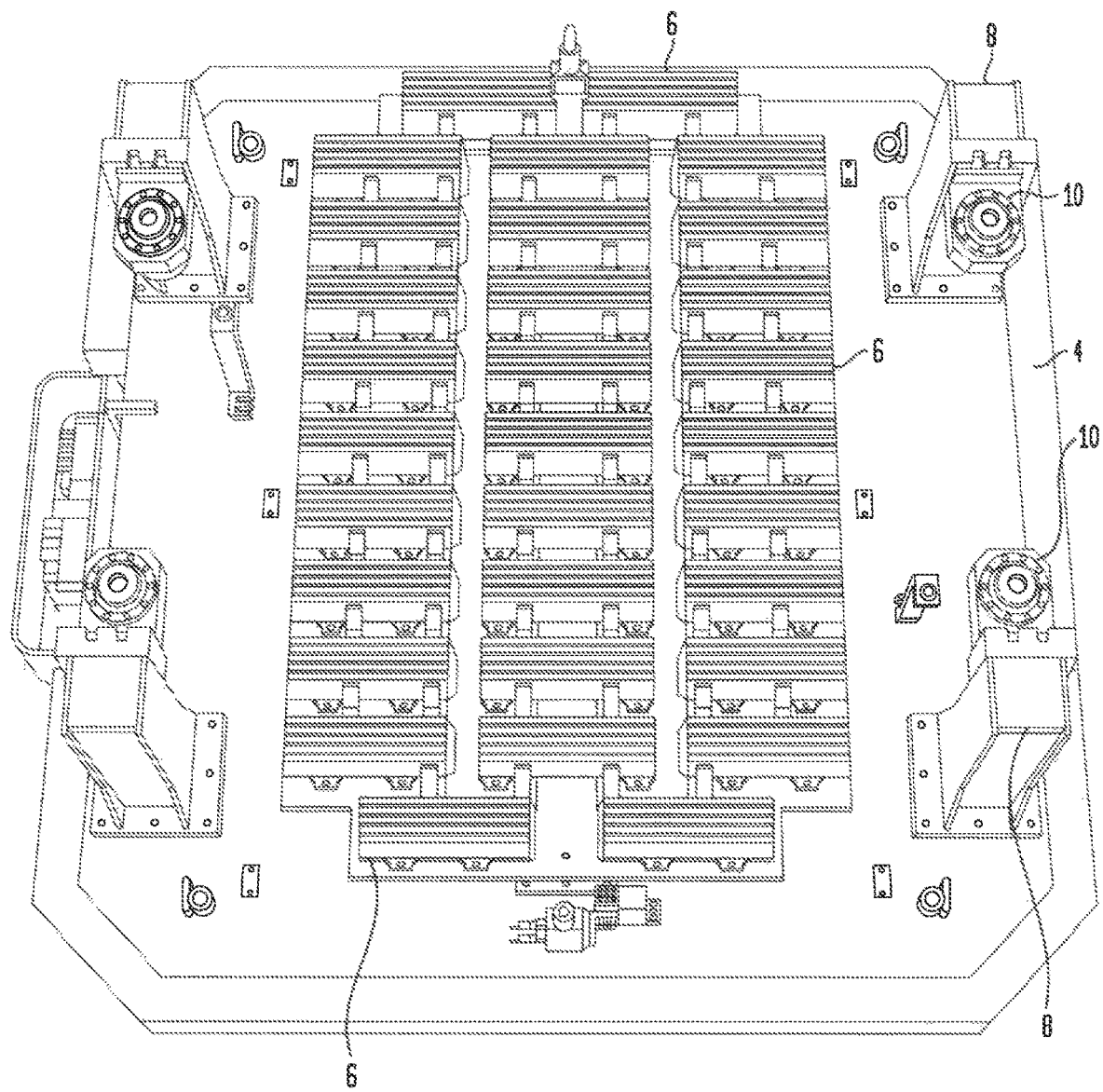
FIGS. 1a and 1b show schematic illustrations of an example of a base device as component of an embodiment of the system according to the invention from different perspectives.
Figure 1B:
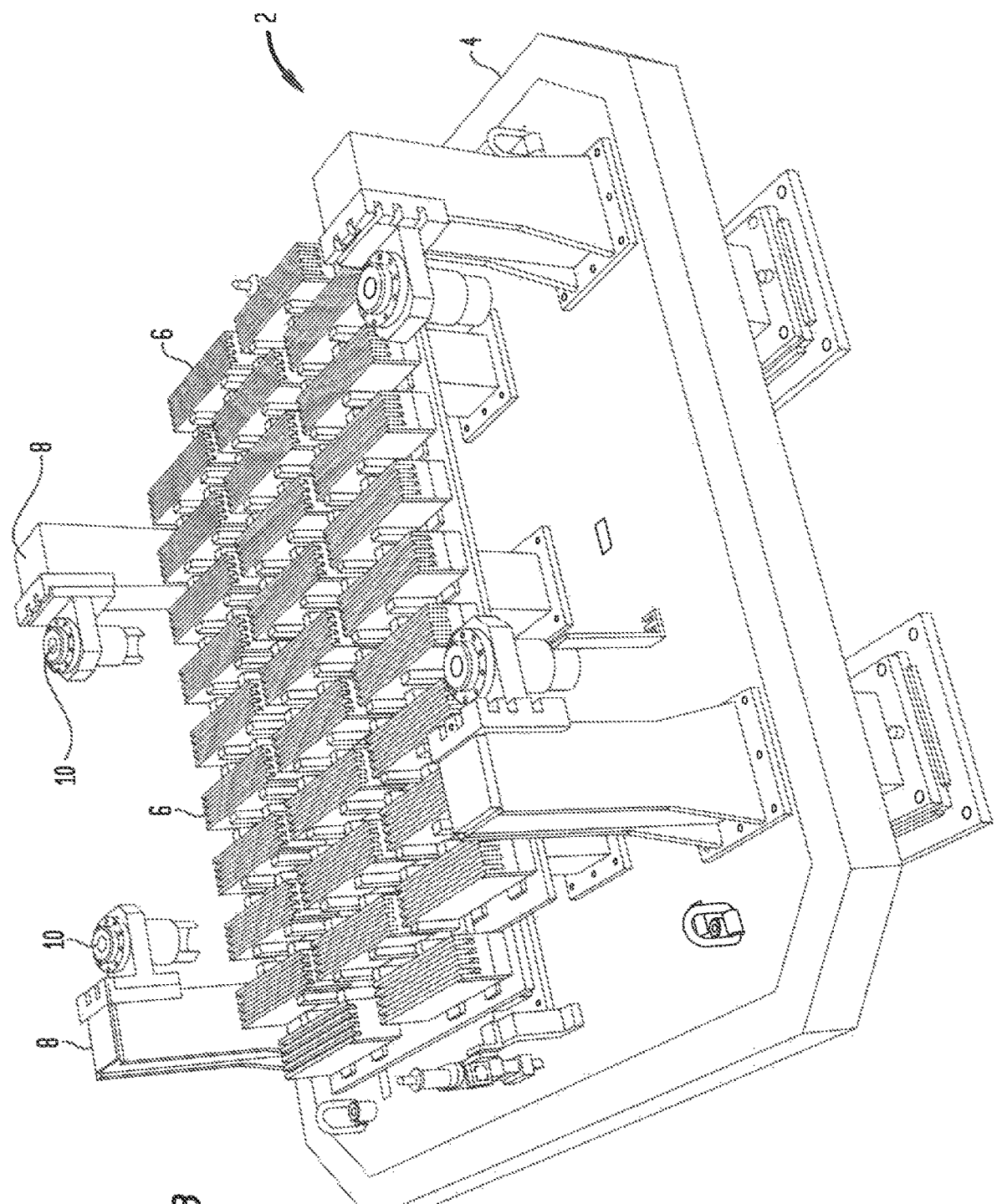

FIGS. 1a and 1b show the base device 2 as bottom part of the embodiment of the system according to the invention from different perspectives. The base device 2 includes hereby at least one plate 4, along which several rows of support elements 6 are arranged. Each of two outer rows includes hereby two support elements 6, which are arranged one behind one another along a respective row. Arranged in-between on the plate 4 are nine rows of support elements 6, with three support elements 6 being arranged side-by-side within a respective row along this row. Moreover, provision is made for each support element 6 to be covered by a heating element, embodied as an induction coil and/or induction loop, with a respective support element 6 being configured as a cover or wall of a respective heating element. Thus, the heating elements are concealed in the figures by walls of the support elements 6 and not visible. Provision is further made for the heating elements to be arranged within a respective row of support elements 6 are also arranged side-by-side and/or behind one another. Each support element 6 encloses hereby a heating element, typically the topside thereof, at least partially. Depending upon the definition, a support element 6 is configured and/or to be designated as housing of a heating element.

Moreover, four holding bars 8 are arranged on the plate 4, with a primary positioning module 10 being arranged on a respective holding bar 8. Provision is made for an arrangement of two holding bars 8 and two primary positioning modules 10 along a line, with the rows of the support elements 6 and the heating elements being arranged between these two lines.

FIG. 2a shows the gripping device 20 as top part of the system from above, whereas FIG. 2b shows the gripping device 20 from below. Arranged here on the bottom side of the gripping device 20 are eleven rows of rail elements 22. Nine such rows include each hereby three rail elements 22 arranged behind one another along a respective row. Moreover, two further rows are provided, each with two rail elements 22, which delimit the other rows. However, the two rail elements 22 of a respective row are also arranged behind one another and/or side-by-side along the row.

Moreover, FIGS. 2a and 2b show secondary positioning modules 24, which are arranged here on two outer sides of a carrier body 26, on which the rows of rail elements 22 are again arranged. Moreover, four clamping modules 28 are arranged at corners of the carrier body 26.

Figure 3A:
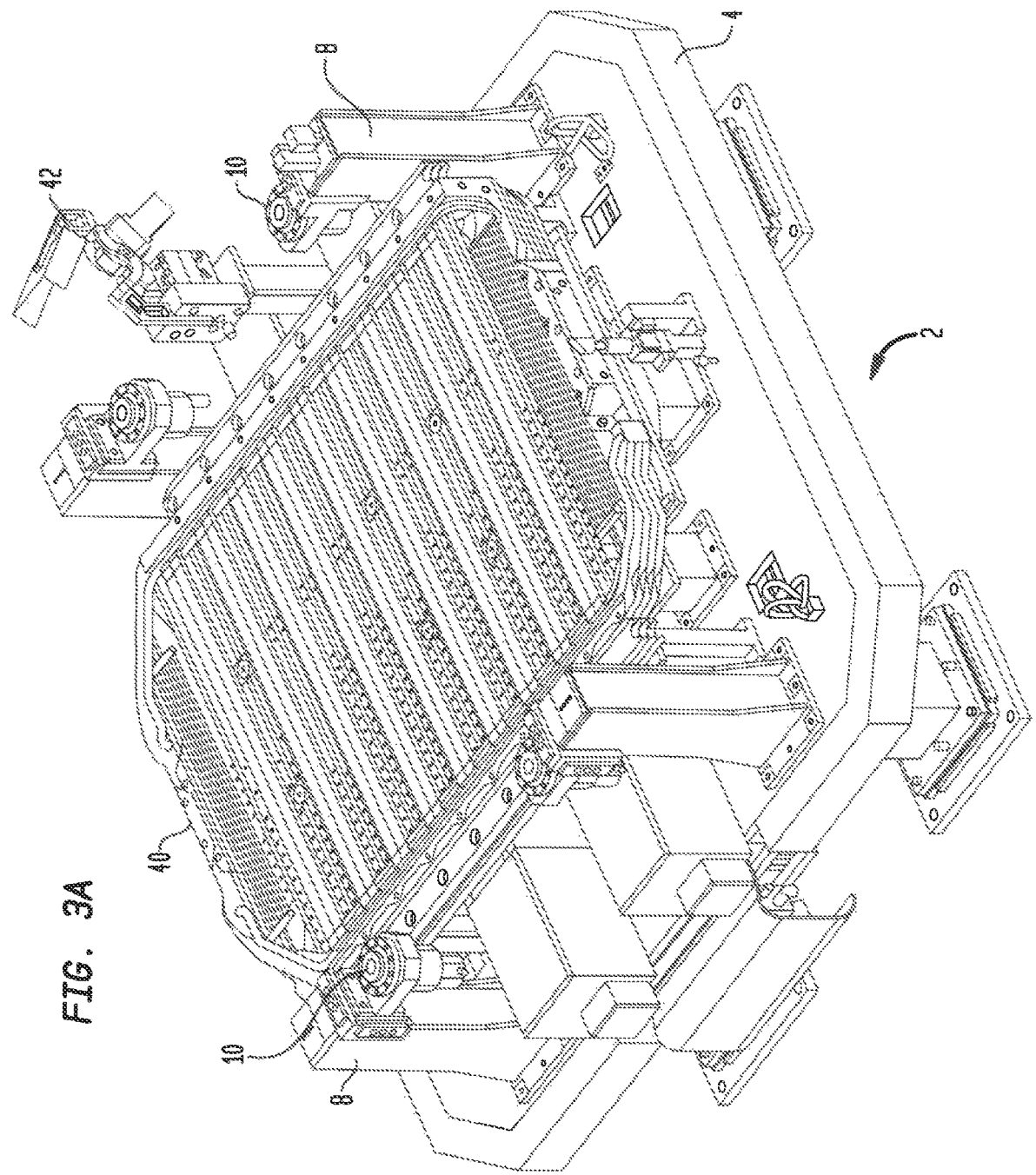

As shown in FIGS. 3a and 3b, when carrying out the embodiment of the method, a component 40 can be arranged on the support elements 6 and thus also on the heating elements of the base device 2 and is provided here as part of a casing for a battery (FIG. 3a). Moreover, the gripping device 20 is arranged on the component 40 and thus also on the base device 2 within the scope of the method. Provision is hereby made for an arrangement of the primary positioning modules 10 of the base device 2 on the secondary positioning modules 24 of the carrier body 26, with the base device 2 and the gripping device 20 being positioned relative to one another and connected to one another via the positioning modules 10, 24.

Provision is hereby also made for an arrangement of each row of support elements 6 and thus also of heating modules of the base device 2 integrated therein to be in congruence or in registry with a respective row of clamping modules 22 of the gripping device 20.

According to the embodiment of the method, the component 40 is first arranged with its bottom side on the rows of support elements 6 and thus also on the rows of heating elements. Thereafter, using at least one application device 42, an adhesive joint having two adhesive components is applied to the topside of the component 40 along a strip and/or as a strip which is in congruence with a row of support elements 6 and heating elements of the base device 2. Moreover, provision is made for an arrangement of cooling elements, e.g. cooling fins, on holding elements of the rail elements 22 along each row of these rail elements 22 and for temporarily fastening of these cooling elements to the rail elements 22 via holding elements. It is hereby provided that a respective row of cooling elements is in congruence with a respective row of rail elements 22. Thereafter, the gripping device 20 is arranged on the base device 2 and thus also on the component 40. Provision is hereby also made for each strip of the adhesive joint to be in congruence with a row of cooling elements. Each row of cooling elements is hereby in congruence with a strip of the adhesive joint.

A minimum distance for an adhesive gap of the adhesive joint is hereby maintained via the positioning modules 10, 24 between an outer side of a respective cooling element and the topside of the component 40. As soon as or after the rows of cooling elements have been applied onto the strips of the adhesive joint, the heating elements of the support elements 6, which are configured as induction coils, are activated, with eddy currents being generated by the heating elements for heating at least the component 40 and possibly also the cooling elements along a respective strip of the adhesive joint. It is further provided to heat the adhesive joint between the component 40 and the cooling elements for an intended period of time to a temperature which is at least as high as the curing temperature of the adhesive joint. As soon as the adhesive joint has cured, the cooling elements are detached from the holding elements of the rail elements 22 and the gripping device 20 is lifted from the component 40. The cooling elements are thus fastened to the topside of the component 40.

The invention claimed is:

1. A system for fastening cooling elements to a component, said system comprising:
   a base device including a number of rows of heating elements to support a bottom side of the component, with the heating elements being arranged along a respective row;
   a gripping device arranged on the base device and including a corresponding number of rows with rail elements along which the cooling elements are to be arranged, with the rail elements being arranged along a respective row such that an nth row of heating elements is in congruence with an nth row of rail elements, said rail elements being configured to temporarily hold the cooling elements on the gripping device; and
   an application device configured to apply an adhesive joint onto a base-device-distal topside of the component in strips in congruence with the rows along which the heating elements are arranged,
   wherein the gripping device is configured to arrange the cooling elements on the strips of the adhesive joint and to press the cooling elements against the topside of the component, and
   wherein the heating elements are configured to heat the adhesive joint between the cooling elements and the topside of the component to a temperature which is at least as high as a curing temperature of the adhesive joint.

2. The system of claim 1, wherein the heating elements include induction coils.

3. The system of claim 1, wherein each rail element includes a holding element configured to temporarily hold a respective one of the cooling elements on the rail element, and a pressure element configured to press the rail element with the cooling element against the topside of the component and to homogeneously disperse the adhesive joint between the cooling element and the topside.

4. The system of claim 1, wherein the base device includes positioning modules and the gripping device includes positioning modules, the positioning modules of the base device and the positioning modules of the gripping device being connectable to one another to thereby position the base device and the gripping device relative to one another and to arrange the nth row of heating elements in congruence with the nth row of rail elements.

5. The system of claim 1, further comprising a clamping module configured to brace the base device and the gripping device to one another.

6. The system of claim 1, wherein the base device includes support elements for arrangement of the component thereon, said support elements being arranged on the heating elements.

7. A method for fastening cooling elements to a component with a system as set forth in claim 1, said method comprising:
arranging the number of rows of heating elements on the base device;
arranging the corresponding number of rows of rail elements on the gripping device;
arranging the gripping device on the base device such that the nth row with heating elements is in congruence with the nth row of rail elements;
placing the component with its bottom side on the heating elements;
applying the adhesive joint onto the base-device distal topside of the component in strips in congruence with the rows along which the heating elements are arranged;
temporarily holding the cooling elements on the gripping device;
arranging the cooling elements along the rows of rail elements on the strips of the adhesive joint;
pressing the cooling elements against the topside of the component; and
heating with the heating elements the adhesive joint between the cooling elements and the topside of the component to a temperature which is at least as high as a curing temperature of the adhesive joint.

8. The method of claim 7, further comprising mixing two adhesive components to form the adhesive joint.

9. The method of claim 7, wherein the component forms part of a casing of a battery.

10. The method of claim 7, wherein the cooling elements and the topside of the component with the adhesive joint located there between are pressed against one another between the rail elements and the heating elements while maintaining an adhesive gap between the topside and the cooling elements.

* * * * *

UNITED STATES PATENT AND TRADEMARK OFFICE
CERTIFICATE OF CORRECTION

PATENT NO. : 11,560,914 B2
APPLICATION NO. : 16/641570
DATED : January 24, 2023
INVENTOR(S) : Andreas Kugler et al.

It is certified that error appears in the above-identified patent and that said Letters Patent is hereby corrected as shown below:

On the Title Page

Under (73) Assignee:
Replace "G.H. Induction Deutschland Induktions-ErwäRmungs-Anlagen GmbH" with the correct
--G.H. Induction Deutschland Induktions-Erwärmungs-Anlagen GmbH--
And add --AUDI AG, INGOLSTADT, GERMANY--

Under (56) FOREIGN PATENT DOCUMENTS:
Add --GB 2387019 A 10-01-2003 Great Britain
DE102014204263 A1 09-10-2015 Germany
DE202012101076 U1 04-19-2012 Germany
DE102014004742 A1 10-01-2015 Germany--

Signed and Sealed this
First Day of August, 2023

Katherine Kelly Vidal
*Director of the United States Patent and Trademark Office*